United States Patent
Odate

(10) Patent No.: US 12,522,281 B2
(45) Date of Patent: Jan. 13, 2026

(54) DRIVING ASSISTANCE DEVICE

(71) Applicant: HONDA MOTOR CO., LTD., Tokyo (JP)

(72) Inventor: Shotaro Odate, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 44 days.

(21) Appl. No.: 18/582,957

(22) Filed: Feb. 21, 2024

(65) Prior Publication Data

US 2024/0317301 A1     Sep. 26, 2024

(30) Foreign Application Priority Data

Mar. 24, 2023  (CN) .......................... 202310303713.4

(51) Int. Cl.
| | |
|---|---|
| B62D 5/04 | (2006.01) |
| B60W 30/12 | (2020.01) |
| B60W 40/09 | (2012.01) |
| B60W 50/08 | (2020.01) |
| B62D 15/02 | (2006.01) |

(52) U.S. Cl.
CPC ........... B62D 5/0481 (2013.01); B60W 30/12 (2013.01); B60W 40/09 (2013.01); B60W 50/085 (2013.01); B62D 15/025 (2013.01); B60W 2420/24 (2013.01); B60W 2540/30 (2013.01)

(58) Field of Classification Search
CPC .... B62D 5/0463; B62D 5/049; B62D 5/0493; B62D 6/10; B60Y 2306/13
See application file for complete search history.

(56) References Cited

U.S. PATENT DOCUMENTS

| | | | |
|---|---|---|---|
| 11,623,688 B2* | 4/2023 | Kim ..................... | B62D 5/0484 701/41 |
| 12,252,186 B2* | 3/2025 | Lee ........................ | B62D 5/001 |

(Continued)

FOREIGN PATENT DOCUMENTS

| | | |
|---|---|---|
| JP | 2002063697 A | 2/2002 |
| JP | 2007299048 A | 11/2007 |

(Continued)

OTHER PUBLICATIONS

Notice of Reasons for Refusal for Japanese Patent Application No. 2024-002373 dated Jun. 24, 2025; 10 pp.

*Primary Examiner* — Phutthiwat Wongwian
(74) *Attorney, Agent, or Firm* — Armstrong Teasdale LLP

(57) ABSTRACT

A driving assistance device includes a steering operation member configured to receive a steering operation, a grip sensor provided in the steering operation member and configured to detect a grip position of a driver, and a controller configured to execute driving assistance control of a vehicle. The controller is configured to store grip tendency data related to a tendency of the grip position of the driver in execution of the driving assistance control, determine whether the driver is gripping the steering operation member with a dominant hand based on the grip tendency data and a detection result of the grip sensor, and make contents of the driving assistance control different depending on whether determining that the driver is gripping the steering operation member with the dominant hand or determining that the driver is not gripping the steering operation member with the dominant hand.

11 Claims, 5 Drawing Sheets

(56) References Cited

U.S. PATENT DOCUMENTS

| | | | |
|---|---|---|---|
| 2018/0281851 A1* | 10/2018 | Maeda | B62D 5/0493 |
| 2020/0298881 A1 | 9/2020 | Odate et al. | |
| 2023/0174146 A1* | 6/2023 | Yoo | B62D 5/0457 |
| | | | 701/41 |
| 2024/0344906 A1* | 10/2024 | Yamada | G01L 1/142 |
| 2024/0421740 A1* | 12/2024 | Park | H02P 25/22 |
| 2024/0425098 A1* | 12/2024 | Kizler | G01R 5/24 |

FOREIGN PATENT DOCUMENTS

| | | | |
|---|---|---|---|
| JP | 2016200985 A | 12/2016 | |
| JP | 2020050345 A | 4/2020 | |

* cited by examiner

*Fig.3*

| driver | | user A | user B | user C |
|---|---|---|---|---|
| ID | | 001 | 002 | 003 |
| grip tendency data GD | left hand count value CL | 32 | 12 | 4 |
| | right hand count value CR | 15 | 18 | 2 |
| | both hands count value CB | 35 | 4 | 8 |

DRIVING ASSISTANCE DEVICE

TECHNICAL FIELD

The present invention relates to a driving assistance device.

BACKGROUND ART

In recent years, there has been an increase in efforts to give consideration to vulnerable people among transport participants and provide them with access to sustainable transport systems. To this end, research and development to further improve traffic safety and convenience through the development of driving assistance technologies is attracting attention.

For example, JP2020-50345A discloses a driving assistance device that executes following travel control and lane keeping assistance control as driving assistance control.

The contents of the driving assistance control that is comfortable for a driver are different depending on how the driver grips a steering operation member (for example, a steering wheel). In particular, the contents of the driving assistance control that is comfortable for the driver are different depending on whether or not the driver is gripping the steering operation member with a dominant hand. Conventional driving assistance devices do not consider the relationship between the driver's dominant hand and the driving assistance control. Accordingly, there is room for improvement in providing the driving assistance control that is comfortable for the driver.

SUMMARY OF THE INVENTION

In view of the above background, an object of the present invention is to provide driving assistance control that is comfortable for a driver depending on whether the driver is gripping a steering operation member with a dominant hand, and to contribute to the development of a sustainable transportation system accordingly.

To achieve such an object, one aspect of the present invention provides a driving assistance device (3), comprising; a steering operation member (22) configured to receive a steering operation of a vehicle (1) by a driver; a grip sensor (35) provided in the steering operation member and configured to detect a grip position of the driver on the steering operation member; and a controller (15) configured to execute driving assistance control of the vehicle, wherein the controller is configured to store grip tendency data (GD) related to a tendency of the grip position of the driver on the steering operation member in execution of the driving assistance control, determine whether the driver is gripping the steering operation member with a dominant hand based on the grip tendency data and a detection result of the grip sensor, and make contents of the driving assistance control different depending on whether determining that the driver is gripping the steering operation member with the dominant hand or determining that the driver is not gripping the steering operation member with the dominant hand.

According to this aspect, it is possible to provide the driving assistance control that is comfortable for the driver depending on whether the driver is gripping the steering operation member with the dominant hand. Accordingly, it is possible to contribute to the development of a sustainable transportation system.

In the above aspect, preferably, the controller is configured to determine, based on the grip tendency data and the detection result of the grip sensor, whether the driver is gripping the steering operation member with only the dominant hand, whether the driver is gripping the steering operation member with only a hand opposite to the dominant hand, and whether the driver is gripping the steering operation member with both hands, make the contents of the driving assistance control different depending on whether determining that the driver is gripping the steering operation member with only the dominant hand, determining that the driver is gripping the steering operation member with only the hand opposite to the dominant hand, or determining that the driver is gripping the steering operation member with both hands.

According to this aspect, it is possible to provide the driving assistance control that is comfortable for the driver depending on whether the driver is gripping the steering operation member with only the dominant hand, whether the driver is gripping the steering operation member with the hand opposite to the dominant hand, and whether the driver is gripping the steering operation member with both hands.

In the above aspect, preferably, in a case where the controller determines that the driver is gripping the steering operation member with only the dominant hand and a prescribed assistance canceling condition is satisfied while the driving assistance control is being executed, the controller cancels specific control included in the driving assistance control that is being executed, and in a case where the controller determines that the driver is gripping the steering operation member with both hands and the assistance canceling condition is satisfied while the driving assistance control is being executed, the controller continues the specific control included in the driving assistance control that is being executed.

In a case where the driver is gripping the steering operation member with both hands, there is a high possibility that the driver is driving the vehicle in a nervous state. In such a case, even if the assistance canceling condition is satisfied, the controller continues the specific control included in the driving assistance control that is being executed. Accordingly, it is possible to extend the driving assistance to the driver who is in a nervous state, and encourage the driver to relieve his/her tension.

In the above aspect, preferably, in a case where the controller determines that the driver is gripping the steering operation member with only the dominant hand while the driving assistance control is being executed, the controller continues the driving assistance control that is being executed, in a case where the controller determines that the driver is gripping the steering operation member with only the hand opposite to the dominant hand while the driving assistance control is being executed, the controller cancels at least a portion of the driving assistance control that is being executed.

In a case where the driver is gripping the steering operation member with only the hand opposite to the dominant hand, the driver may be less attentive to driving, and an immediate steering operation may be delayed. In such a case, the controller cancels at least a portion of the driving assistance control that is being executed. Thus, it is possible to limit the driving assistance to the driver and call the driver's attention. Accordingly, it may be possible to encourage the driver to correct the state of gripping the steering operation member with only the hand opposite to the dominant hand and shift to the state of gripping the steering operation member with both hands.

In the above aspect, preferably, the controller is configured to execute, as the driving assistance control, following travel control to cause the vehicle to follow a preceding vehicle while maintaining a prescribed inter-vehicle distance, and lane keeping assistance control to assist the steering operation of the vehicle by the driver such that the vehicle maintains a traveling position within a lane, in a case where the controller determines that the driver is gripping the steering operation member with only the dominant hand while the following travel control and the lane keeping assistance control are being executed simultaneously, the controller continues the following travel control and the lane keeping assistance control that are being executed, and in a case where the controller determines that the driver is gripping the steering operation member with only the hand opposite to the dominant hand while the following travel control and the lane keeping assistance control are being executed simultaneously, the controller cancels at least one of the following travel control and the lane keeping assistance control that are being executed.

While the following travel control and the lane keeping assistance control are being executed simultaneously, the driving assistance in the front-and-rear direction of the vehicle and the driving assistance in the lateral direction of the vehicle are being executed simultaneously, and thus the driver tends to be less attentive to driving. Accordingly, in a case where the driver is gripping the steering operation member with only the hand opposite to the dominant hand while the following travel control and the lane keeping assistance control are being executed simultaneously, the controller cancels at least one of the following travel control and the lane keeping assistance control. Thus, it is possible to limit the driving assistance to the driver and call the driver's attention.

In the above aspect, preferably, the controller is configured to collect the grip tendency data while the following travel control and the lane keeping assistance control are being executed simultaneously.

According to this aspect, it is possible to accurately determine whether the driver is gripping the steering operation member with the dominant hand based on the tendency of the grip position of the driver at the period during which the following travel control and the lane keeping assistance control are being executed simultaneously.

In the above aspect, preferably, the grip tendency data at least includes: left hand data that indicates the number of times the driver grips the steering operation member with only a left hand while the driving assistance control is being executed, frequency with which the driver grips the steering operation member with only the left hand while the driving assistance control is being executed, or a period in which the driver grips the steering operation member with only the left hand while the driving assistance control is being executed; and right hand data that indicates the number of times the driver grips the steering operation member with only a right hand while the driving assistance control is being executed, frequency with which the driver grips the steering operation member with only the right hand while the driving assistance control is being executed, or a period in which the driver grips the steering operation member with only the right hand while the driving assistance control is being executed, and the controller is configured to estimate the dominant hand of the driver based on the grip tendency data, and determine whether the driver is gripping the steering operation member with the dominant hand based on an estimation result of the dominant hand of the driver and the detection result of the grip sensor.

According to this aspect, it is possible to accurately estimate the dominant hand of the driver based on the data on the past grip position. Accordingly, it is possible to accurately determine whether the driver is gripping the steering operation member with the dominant hand.

In the above aspect, preferably, the grip tendency data further includes both hands data that indicates the number of times the driver grips the steering operation member with both hands while the driving assistance control is being executed, frequency with which the driver grips the steering operation member with both hands while the driving assistance control is being executed, or a period in which the driver grips the steering operation member with both hands while the driving assistance control is being executed.

According to this aspect, it is possible to more accurately estimate the dominant hand of the driver based on the data on the past grip position. Accordingly, it is possible to more accurately determine whether the driver is gripping the steering operation member with the dominant hand.

In the above aspect, preferably, the grip sensor includes a capacitive sensor configured such that capacitance of the capacitive sensor changes as a driver's hand approaches the steering operation member.

According to this aspect, it is possible to accurately detect the grip position of the driver on the steering operation member.

Thus, according to the above aspects, it is possible to provide driving assistance control that is comfortable for a driver depending on whether the driver is gripping a steering operation member with a dominant hand.

BRIEF DESCRIPTION OF THE DRAWING(S)

FIG. 3 is a table showing grip tendency data according to the embodiment of the present invention;

DETAILED DESCRIPTION OF THE INVENTION

<The Vehicle 1>

Figure 1:
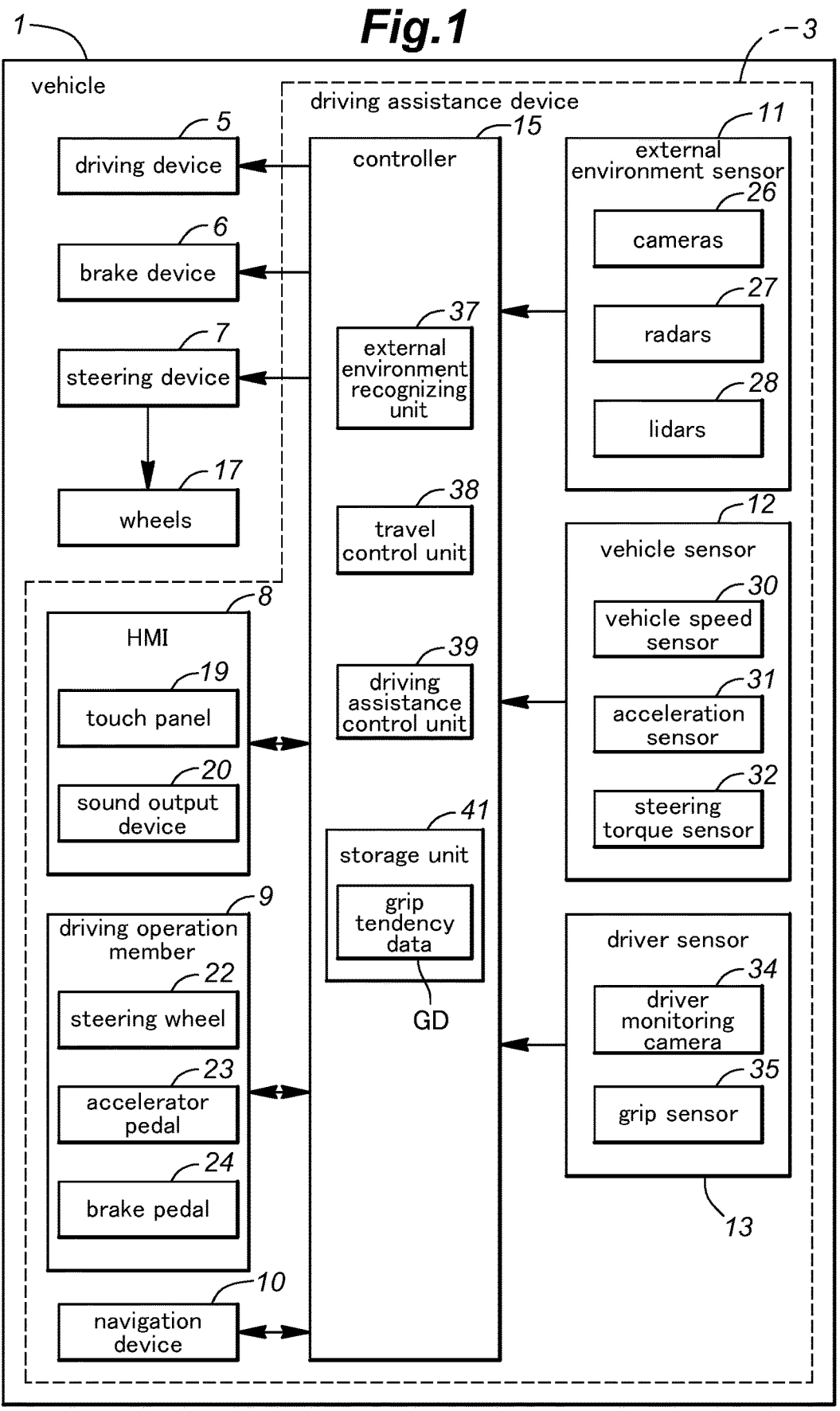
FIG. 1 is a functional block diagram showing a vehicle to which a driving assistance device according to an embodiment of the present invention is applied.

First, with reference to FIG. 1, a vehicle 1 to which a driving assistance device 3 according to an embodiment of the present invention is applied will be described. For example, the vehicle 1 is an automobile. In another embodiment, the vehicle 1 may be a vehicle (for example, a motorcycle) other than an automobile.

The vehicle 1 includes a driving device 5, a brake device 6, a steering device 7, a Human Machine Interface 8 (HMI), a driving operation member 9, a navigation device 10, an external environment sensor 11, a vehicle sensor 12, a driver sensor 13, and a controller 15. Hereinafter, the components of the vehicle 1 will be described in order.

The driving device 5 is a device that applies a driving force to the vehicle 1. The driving device 5 includes a drive source that generates a driving force for driving the vehicle 1. For example, the drive source is configured by an internal combustion engine and/or an electric motor.

The brake device 6 is a device that applies a braking force to the vehicle 1. For example, the brake device 6 includes a brake caliper that presses a pad against a brake rotor, and an electric cylinder that supplies hydraulic pressure to the brake caliper.

The steering device 7 is a device that changes a turning angle of wheels 17 by turning the wheels 17. For example, the steering device 7 includes a rack and pinion mechanism connected to the wheels 17 and an electric motor that drives the rack and pinion mechanism.

The HMI 8 is a device that presents information to an occupant (for example, the driver) of the vehicle 1 and receives information input by the occupant. The HMI 8 includes a touch panel 19 and a sound output device 20. The touch panel 19 displays various screens to the occupant and receives input operations on the various screens by the occupant. The sound output device 20 outputs audio guidance, warning sounds, or the like.

The driving operation member 9 is a device that receives a driving operation by the driver. The driving operation member 9 includes a steering wheel 22 (an example of a steering operation member) that receives the steering operation of the vehicle 1 by the driver, an accelerator pedal 23 that receives an acceleration operation of the vehicle 1 by the driver, and a brake pedal 24 that receives a brake operation of the vehicle 1 by the driver. Details of the steering wheel 22 will be described later.

The navigation device 10 is a device that provides route guidance to the destination of the vehicle 1. The navigation device 10 identifies the current position of the vehicle 1 based on GNSS signals received from artificial satellites. The navigation device 10 sets a route to the destination of the vehicle 1 based on the current position of the vehicle 1 and the destination of the vehicle 1 input into the touch panel 19 by the occupant.

The external environment sensor 11 is a device that detects the state of the external environment of the vehicle 1. The external environment sensor 11 includes a plurality of cameras 26, a plurality of radars 27, and a plurality of lidars 28 (LiDAR). Each camera 26 captures an image of a target (surrounding vehicles such as a preceding vehicle, pedestrians, structures on a road, lane markings, or the like) existing around the vehicle 1. Each radar 27 detects the position of the target existing around the vehicle 1 by emitting radio waves such as millimeter waves around the vehicle 1 and capturing the reflected waves thereof. Each lidar 28 detects the position of the target existing around the vehicle 1 by irradiating light such as infrared rays around the vehicle 1 and capturing the reflected light thereof.

The vehicle sensor 12 is a sensor that detects various vehicle states. The vehicle sensor 12 includes a vehicle speed sensor 30 that detects the vehicle speed of the vehicle 1, an acceleration sensor 31 that detects the acceleration (lateral acceleration) of the vehicle 1 in the lateral direction, and a steering torque sensor 32 that detects the steering torque generated in response to the steering operation of the vehicle 1 by the driver.

The driver sensor 13 is a device that detects the state of the driver. The driver sensor 13 includes a driver monitoring camera 34 and a grip sensor 35. The driver monitoring camera 34 captures an image of the driver. The grip sensor 35 is provided in the steering wheel 22 and detects a grip position of the driver on the steering wheel 22. Details of the grip sensor 35 will be described later.

The controller 15 constitutes the driving assistance device 3 together with the HMI 8, the driving operation member 9, the navigation device 10, the external environment sensor 11, the vehicle sensor 12, and the driver sensor 13.

The controller 15 is an electronic control unit (ECU) consisting of a computer configured to perform various processes. The controller 15 includes an arithmetic processing unit (a processor such as CPU and MPU) and a storage device (memory such as ROM and RAM). The arithmetic processing unit reads necessary software from the storage device and executes prescribed arithmetic processing according to the read software. The controller 15 may be configured as one piece of hardware, or may be configured as a unit consisting of plural pieces of hardware. The controller 15 is connected to each component of the vehicle 1 via a communication network such as Controller Area Network (CAN), and controls each component of the vehicle 1.

The controller 15 includes, as functional components, an external environment recognizing unit 37, a travel control unit 38, a driving assistance control unit 39, and a storage unit 41. At least some of the functional components of the controller 15 may be realized by hardware such as LSI, ASIC, and FPGA, or may be realized by a combination of software and hardware.

The external environment recognizing unit 37 recognizes the state of the external environment of the vehicle 1 based on the detection result of the external environment sensor 11. For example, the external environment recognizing unit 37 recognizes the target (surrounding vehicles such as a preceding vehicle, pedestrians, structures on a road, lane markings, or the like) existing around the vehicle 1 based on the detection result of the external environment sensor 11.

The travel control unit 38 controls the traveling of the vehicle 1 according to the driving operation on the driving operation member 9 by the driver. For example, the travel control unit 38 controls the steering device 7 to turn the vehicle 1 in response to the steering operation of the vehicle 1 on the steering wheel 22 by the driver. The travel control unit 38 controls the driving device 5 according to the acceleration operation of the vehicle 1 on the accelerator pedal 23 by the driver, and accelerates the vehicle 1. The travel control unit 38 controls the brake device 6 in response to the brake operation of the vehicle 1 on the brake pedal 24 by the driver, and decelerates the vehicle 1.

The driving assistance control unit 39 executes advanced driving assistance control (Advanced Driver Assistance Systems: ADAS) of the vehicle 1 based on the recognition result of the external environment recognizing unit 37. Hereinafter, the advanced driving assistance control will be abbreviated as "driving assistance control".

The driving assistance control unit 39 is configured to execute following travel control (adaptive cruise control: ACC) as the driving assistance control. When executing ACC, the driving assistance control unit 39 controls the driving device 5 and the brake device 6 to cause the vehicle 1 to follow the preceding vehicle while maintaining a prescribed inter-vehicle distance.

The driving assistance control unit 39 is configured to execute lane keeping assistance control (Lane Keeping Assistance System: LKAS) as the driving assistance control. When executing LKAS, the driving assistance control unit 39 controls the steering wheel 22 and the steering device 7 to assist the steering operation of the vehicle 1 by the driver such that the vehicle 1 maintains the traveling position within a lane.

The driving assistance control unit 39 is configured to execute collision mitigation brake control (Collision Mitigation Brake System: CMBS) as the driving assistance control. When executing CMBS, the driving assistance control unit 39 controls the brake device 6 to mitigate the collision between the vehicle 1 and an object outside the vehicle.

The storage unit 41 stores various data for the driving assistance control. For example, the storage unit 41 stores grip tendency data GD related to a tendency of the grip position of the driver on the steering wheel 22 in execution of the driving assistance control. Details of the grip tendency data GD will be described later.

In the following, for convenience of explanation, the functional components of the controller 15 will be simply referred to as "the controller 15" without distinction.

<The Configuration of the Steering Wheel 22>

Figure 2:
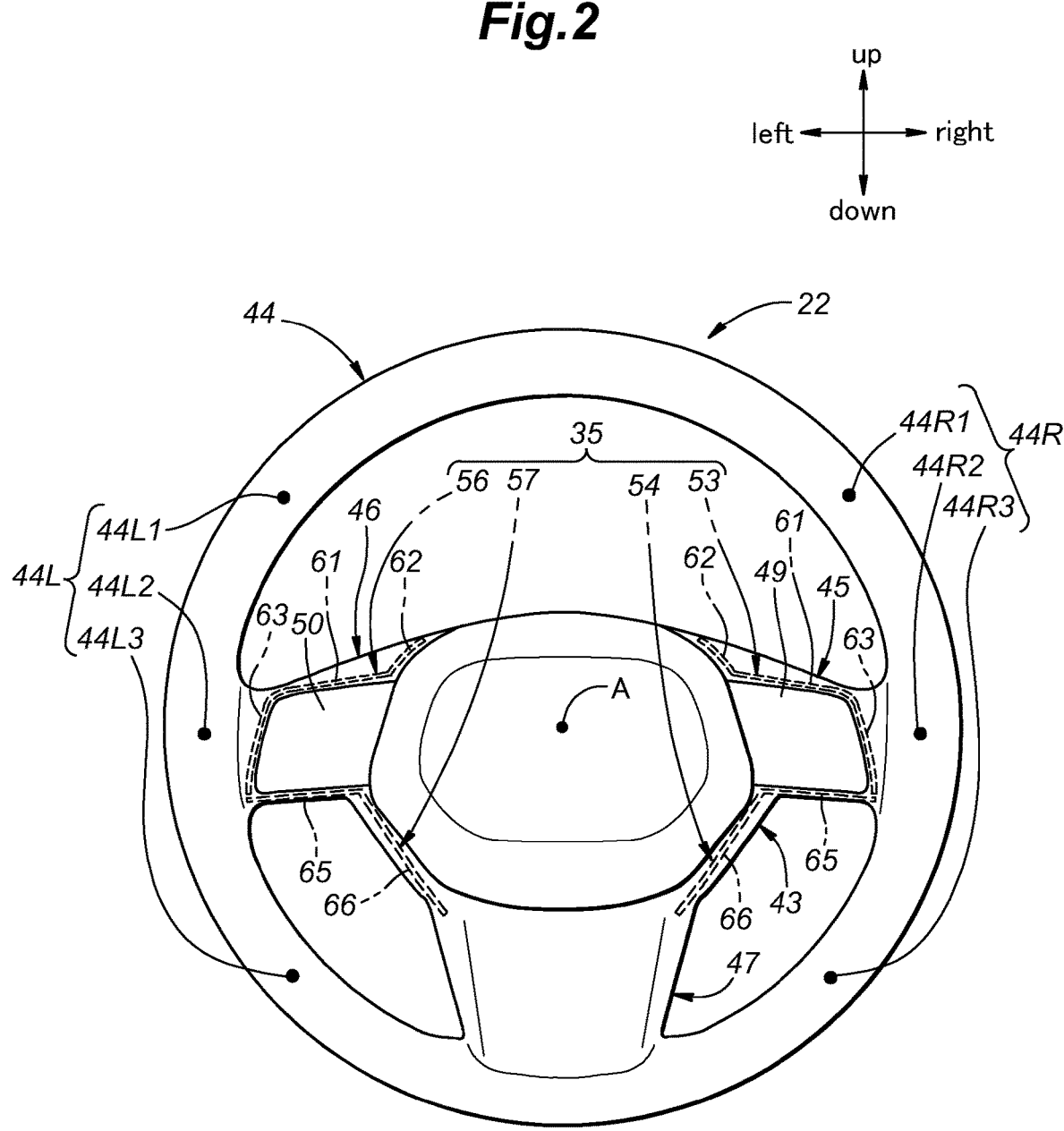
FIG. 2 is a front view showing a steering wheel according to the embodiment of the present invention.

Next, the configuration of the steering wheel 22 will be described with reference to FIG. 2. Hereinafter, the simple phrase "the radial direction" refers to the radial direction of the steering wheel 22, and the simple phrase "the circumferential direction" refers to the circumferential direction of the steering wheel 22.

The steering wheel 22 includes a cylindrical hub 43 provided on a rotation axis A of the steering wheel 22, an annular rim 44 provided outside the hub 43 with respect to the radial direction, and a plurality of spokes 45 to 47 extending in the radial direction and connecting the hub 43 and the rim 44.

The hub 43 is rotatably connected to a steering shaft (not shown) connected to the steering device 7. Thus, the steering wheel 22 is rotatably supported by the steering shaft.

The rim 44 is spaced away from the hub 43 with respect to the radial direction. In another embodiment, the plurality of spokes 45 to 47 may be omitted, and the rim 44 may be directly connected to the hub 43.

The plurality of spokes 45 to 47 is spaced away from each other with respect to the circumferential direction. The plurality of spokes 45 to 47 includes a right spoke 45 extending rightward from the hub 43, a left spoke 46 extending leftward from the hub 43, and a lower spoke 47 extending downward from the hub 43. A rectangular right switch unit 49 is provided on a rear surface (a surface on the driver's side) of the right spoke 45. For example, the right switch unit 49 includes a switch for starting/ending the driving assistance control, a switch for changing the state of the driving assistance control (for example, a set vehicle speed in ACC), and the like. A rectangular left switch unit 50 is provided on a rear surface (a surface on the driver's side) of the left spoke 46. For example, the left switch unit 50 includes a switch for operating an air conditioner (not shown), a switch for operating the navigation device 10, and the like.

<The Configuration and Action of the Grip Sensor 35>

Next, the configuration and action of the grip sensor 35 will be described with reference to FIG. 2.

The grip sensor 35 includes a first right capacitive sensor 53, a second right capacitive sensor 54, a first left capacitive sensor 56, and a second left capacitive sensor 57. Hereinafter, when the first right capacitive sensor 53, the second right capacitive sensor 54, the first left capacitive sensor 56, and the second left capacitive sensor 57 are not distinguished, they will be referred to as "capacitive sensor(s) 53, 54, 56, and 57".

Each capacitive sensor 53, 54, 56, and 57 is formed of an electrode that can be capacitively coupled to an object approaching the steering wheel 22. As the driver's hand approaches the steering wheel 22, the distance between the driver's hand and the electrode forming the capacitive sensor 53, 54, 56, and 57 becomes shorter, and thus the capacitance (an example of a detection value) of the capacitive sensor 53, 54, 56, and 57 increases. The capacitive sensor 53, 54, 56, and 57 is configured such that the capacitance of the capacitive sensor 53, 54, 56, and 57 starts to change as the driver's hand approaches the steering wheel 22 in a state where the driver's hand is not in contact with the steering wheel 22.

The first right capacitive sensor 53 is arranged in the right spoke 45. The first right capacitive sensor 53 includes a first extending portion 61 extending in the lateral direction along an upper edge of the right switch unit 49, a second extending portion 62 bent upward from a left end (an inner end in the radial direction) of the first extending portion 61 and extending along an upper outer circumference of the hub 43, and a third extending portion 63 bent downward from a right end (an outer end in the radial direction) of the first extending portion 61 and extending along a right edge (outer edge) of the right switch unit 49.

The second right capacitive sensor 54 is arranged below the first right capacitive sensor 53 and extending in the right spoke 45 and the hub 43. The second right capacitive sensor 54 includes an upper extending portion 65 extending in the lateral direction along a lower edge of the right switch unit 49, and a lower extending portion 66 bent downward from a left end (an inner end in the radial direction) of the upper extending portion 65 and extending along a lower outer circumference of the hub 43.

The first left capacitive sensor 56 is arranged in the left spoke 46. The first left capacitive sensor 56, like the first right capacitive sensor 53, includes the first extending portion 61, the second extending portion 62, and the third extending portion 63.

The second left capacitive sensor 57 is arranged below the first left capacitive sensor 56 and extending in the left spoke 46 and the hub 43. The second left capacitive sensor 57, like the second right capacitive sensor 54, includes an upper extending portion 65 and a lower extending portion 66.

When the driver's right hand grips a right upper portion 44R1 of the rim 44, the capacitance of the first right capacitive sensor 53 increases to a reference value or more. In this case, the controller 15 estimates that the driver's right hand is gripping the right upper portion 44R1 of the rim 44. In other words, the grip sensor 35 detects that the driver's right hand is gripping the right upper portion 44R1 of the rim 44.

When the driver's right hand grips a right intermediate portion 44R2 of the rim 44, the capacitance of the first right capacitive sensor 53 and the second right capacitive sensor 54 increases to the reference value or more. In this case, the controller 15 estimates that the driver's right hand is gripping the right intermediate portion 44R2 of the rim 44. In other words, the grip sensor 35 detects that the driver's right hand is gripping the right intermediate portion 44R2 of the rim 44.

When the driver's right hand grips a right lower portion 44R3 of the rim 44, the capacitance of the second right capacitive sensor 54 increases to the reference value or more. In this case, the controller 15 estimates that the driver's right hand is gripping the right lower portion 44R3 of the rim 44. In other words, the grip sensor 35 detects that the driver's right hand is gripping the right lower portion 44R3 of the rim 44.

As described above, when the capacitance of at least one of the first right capacitive sensor 53 and the second right capacitive sensor 54 increases to the reference value or more, the grip sensor 35 detects that the driver's right hand is gripping the right upper portion 44R1, the right intermediate portion 44R2, or the right lower portion 44R3 of the rim 44 (hereinafter collectively referred to as "the right side portion 44R of the rim 44"). Similarly, when the capacitance of at least one of the first left capacitive sensor 56 and the second left capacitive sensor 57 increases to the reference value or more, the grip sensor 35 detects that the driver's left hand is gripping a left upper portion 44L1, a left intermediate portion 44L2, or a left lower portion 44L3 of the rim 44 (hereinafter collectively referred to as "the left side portion 44L of the rim 44").

Hereinafter, "the left detection state" refers to a state where the grip sensor 35 does not detect that the driver's right hand is gripping the right side portion 44R of the rim 44 but detects that the driver's left hand is gripping the left side portion 44L of the rim 44. Further, "the right detection state" refers to a state where the grip sensor 35 detects that the driver's right hand is gripping the right side portion 44R of the rim 44 but does not detect that the driver's left hand is gripping the left side portion 44L of the rim 44. Further, "the both detection state" refers to a state where the grip sensor 35 detects that the driver's right hand is gripping the right side portion 44R of the rim 44, and that the driver's left hand is gripping the left side portion 44L of the rim 44.

<The Grip Tendency Data GD>

Next, the above-mentioned grip tendency data GD will be described with reference to FIG. 3. As described above, the grip tendency data GD is related to the tendency of the grip position of the driver on the steering wheel 22 in execution of the driving assistance control. In a case where a plurality of users are registered as drivers of the vehicle 1, the grip tendency data GD may be linked to the ID of each user registered as the driver of the vehicle 1.

The grip tendency data GD includes a left hand count value CL (an example of left hand data), a right hand count value CR (an example of right hand data), and a both hands count value CB (an example of both hands data). The left hand count value CL indicates the number of times the driver grips the steering wheel 22 with only the left hand while the driving assistance control is being executed. The right hand count value CR indicates the number of times the driver grips the steering wheel 22 with only the right hand while the driving assistance control is being executed. The both hands count value CB indicates the number of times the driver grips the steering wheel 22 with both hands while the driving assistance control is being executed.

<The Data Collecting Process>

Figure 4:
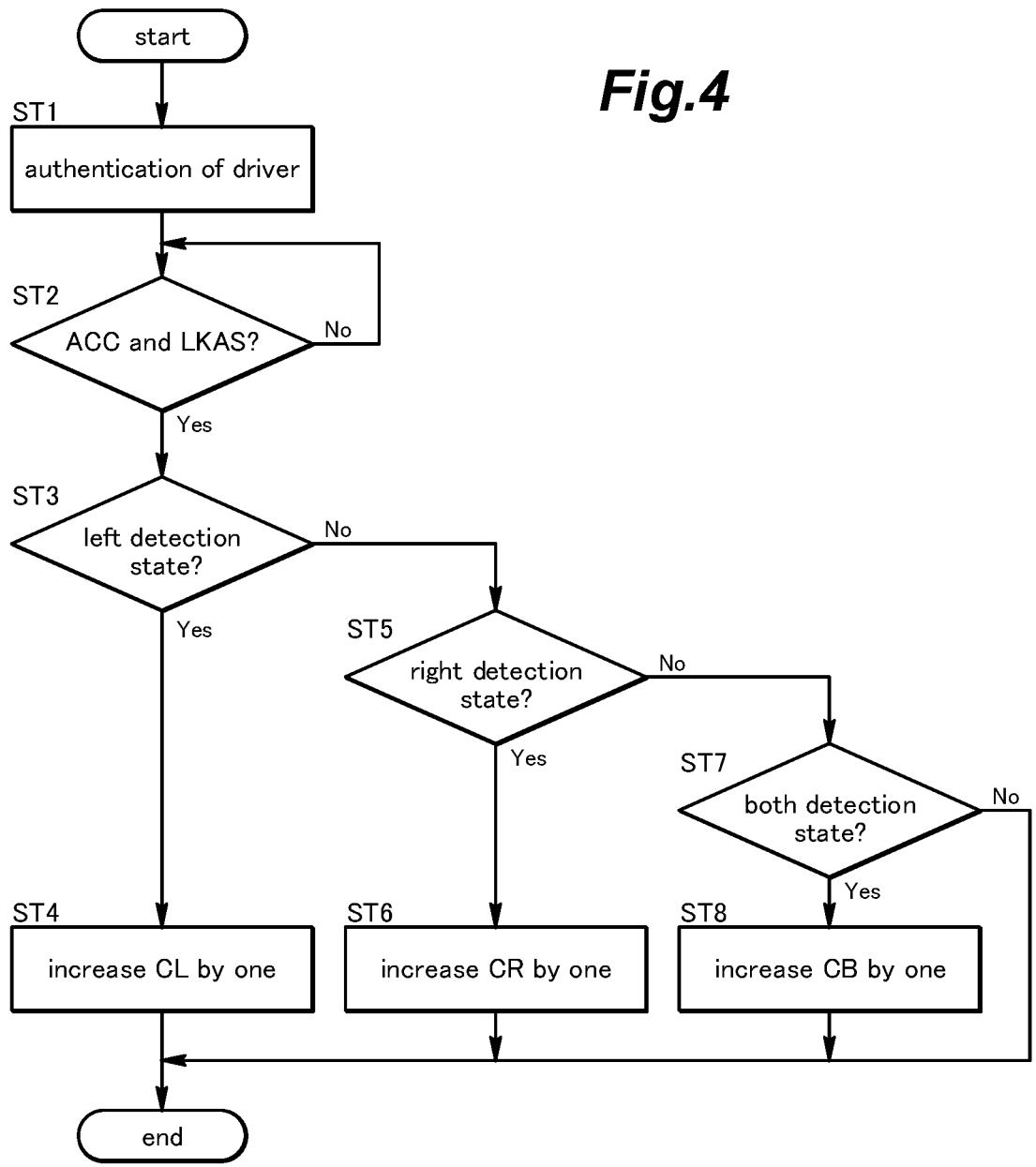
FIG. 4 is a flowchart showing a data collecting process according to the embodiment of the present invention.

Next, a data collecting process for collecting the grip tendency data GD will be described with reference to FIG. 4.

When the data collecting process is started, the controller 15 authenticates the driver, thereby identifying which user among the plurality of users registered as drivers of the vehicle 1 is the current driver (step ST1). For example, the controller 15 may authenticate the driver based on the image of the driver captured by the driver monitoring camera 34. Alternatively, the controller 15 may authenticate the driver by communicating with a mobile terminal carried by each user. In a case where only one user is registered as the driver of the vehicle 1, the authentication of the driver may be omitted.

Next, the controller 15 determines whether ACC and LKAS are being executed simultaneously (step ST2). In a case where at least one of ACC and LKAS is not executed (step ST2: No), the controller 15 repeats the determination in step ST2 at prescribed time intervals.

In a case where ACC and LKAS are being executed simultaneously (step ST2: Yes), the controller 15 determines whether the detection state of the grip sensor 35 is the left detection state based on the detection result of the grip sensor 35 (step ST3). In a case where the detection state of the grip sensor 35 is the left detection state (step ST3: Yes), the controller 15 increases the left hand count value CL by one (step ST4), and ends the data collecting process.

In a case where the detection state of the grip sensor 35 is not the left detection state (step ST3: No), the controller 15 determines whether the detection state of the grip sensor 35 is the right detection state based on the detection result of the grip sensor 35 (step ST5). In a case where the detection state of the grip sensor 35 is the right detection state (step ST5: Yes), the controller 15 increases the right hand count value CR by one (step ST6), and ends the data collecting process.

In a case where the detection state of the grip sensor 35 is not the right detection state (step ST5: No), the controller 15 determines whether the detection state of the grip sensor 35 is the both detection state based on the detection result of the grip sensor 35 (step ST7). In a case where the detection state of the grip sensor 35 is the both detection state (step ST7: Yes), the controller 15 increases the both hands count value CB by one (step ST8), and ends the data collecting process.

In a case where the detection state of the grip sensor 35 is not the both detection state (step ST7: No), the controller 15 ends the data collecting process without increasing the left hand count value CL, the right hand count value CR, and the both hands count value CB.

As described above, the controller 15 collects the grip tendency data GD while ACC and LKAS are being executed simultaneously.

<The Control Changing Process>

Figure 5:
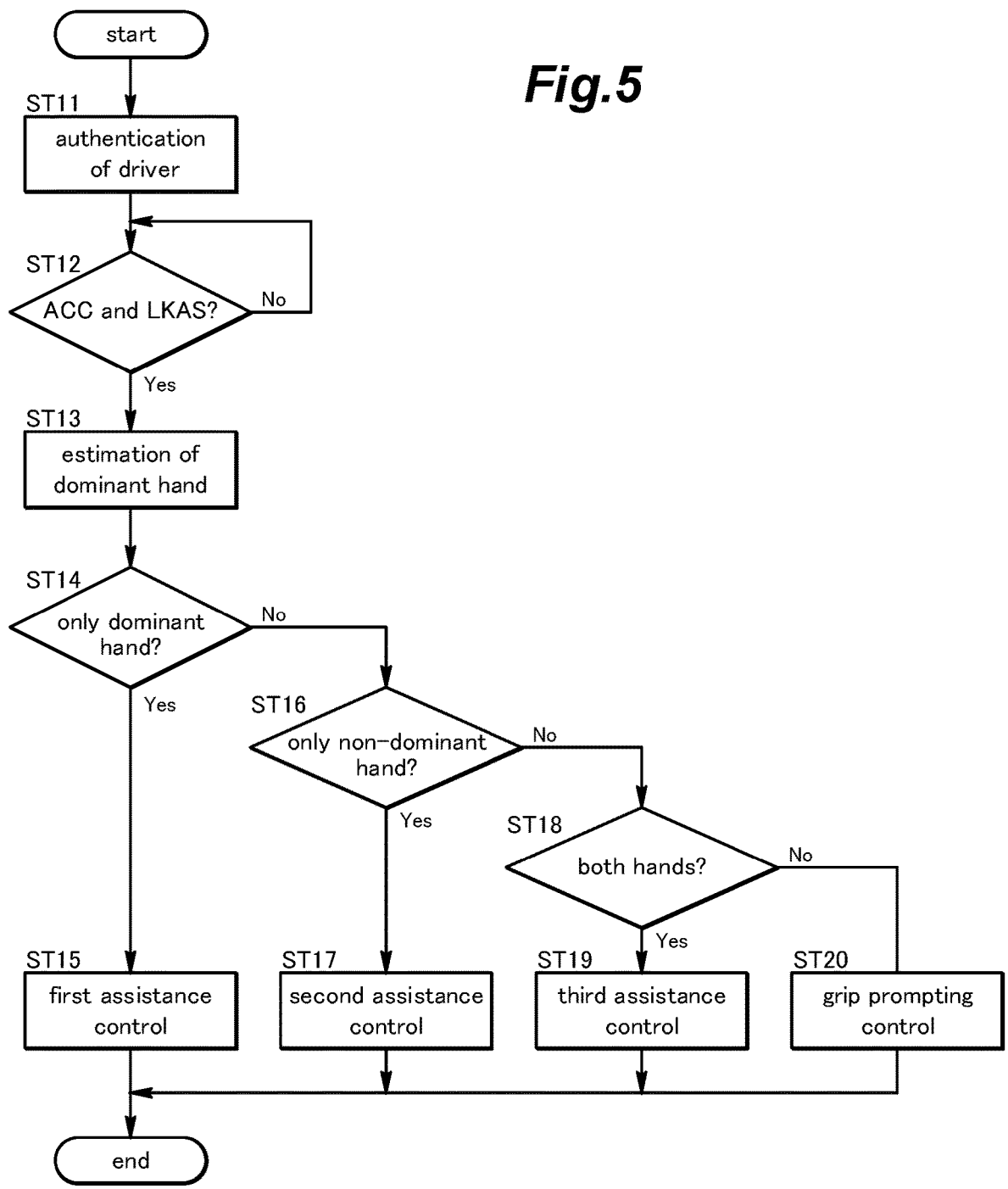
FIG. 5 is a flowchart showing a control changing process according to the embodiment of the present invention.

Next, a control changing process for changing the contents of the driving assistance control will be described with reference to FIG. 5. The control changing process may be executed continuously after the data collecting process, or may be executed separately from the data collecting process.

The contents of steps ST11 and ST12 of the control changing process are the same as the contents of steps ST1 and ST2 of the data collecting process described above, so the description thereof will be omitted. Steps ST11 and ST12 of the control changing process may be omitted in a case where the control changing process is executed continuously after the data collecting process.

In a case where ACC and LKAS are being executed simultaneously (step ST12: Yes), the controller 15 estimates the dominant hand of the driver based on the grip tendency data GD (step ST13). For example, the controller 15 estimates the driver's hand corresponding to the larger one of the left hand count value CL and the right hand count value CR to be the dominant hand of the driver. In a case where the controller 15 cannot estimate the dominant hand of the driver (for example, in a case where the left hand count value CL and the right hand count value CR are the same), the controller 15 may end the control changing process without executing steps ST14 to ST20 that will be described later.

Next, the controller 15 determines whether the driver is gripping the steering wheel 22 with only the dominant hand (step ST14) based on the estimation result of the dominant hand of the driver in step ST13 and the detection result of the grip sensor 35. More specifically, in a case where the left or right of the dominant hand of the driver estimated in step ST13 matches the left or right of the detection state of the grip sensor 35 (for example, in a case where the dominant hand of the driver estimated in step ST13 is the right hand, and the detection state of the grip sensor 35 is the right detection state), the controller 15 determines that the driver is gripping the steering wheel 22 with only the dominant hand. Otherwise, the controller 15 determines that the driver is not gripping the steering wheel 22 with only the dominant hand.

In a case where the controller 15 determines that the driver is gripping the steering wheel 22 with only the dominant hand (step ST14: Yes), the controller 15 executes a first assistance control as the driving assistance control (step ST15). In the first assistance control, the controller 15 continues the driving assistance control (i.e., ACC and LKAS) that is being executed. In a case where a prescribed assistance canceling condition is satisfied while the first assistance control is being executed, the controller 15 cancels specific control included in the driving assistance control that is being executed. For example, in a case where the lateral acceleration of the vehicle 1 becomes a prescribed reference acceleration or more while the first assistance control is being executed, the controller 15 cancels LKAS after receiving the driver's approval.

In a case where the controller 15 determines that the driver is not gripping the steering wheel 22 with only the dominant hand (step ST14: No), the controller 15 determines whether the driver is gripping the steering wheel 22 with only a hand (hereinafter referred to as "the non-dominant hand") opposite to the dominant hand (step ST16) based on the estimation result of the dominant hand of the driver in step ST13 and the detection result of the grip sensor 35. More specifically, in a case where the left or right of the dominant hand of the driver estimated in step ST13 is opposite to the left or right of the detection state of the grip sensor 35 (for example, in a case where the dominant hand of the driver estimated in step ST13 is the right hand, and the detection state of the grip sensor 35 is the left detection state), the controller 15 determines that the driver is gripping the steering wheel 22 with only the non-dominant hand. Otherwise, the controller 15 determines that the driver is not gripping the steering wheel 22 with only the non-dominant hand.

In a case where the controller 15 determines that the driver is gripping the steering wheel 22 with only the non-dominant hand (step ST16: Yes), the controller 15 executes a second assistance control as the driving assistance control (step ST17). In the second assistance control, the controller 15 cancels at least a portion of the driving assistance control (i.e., ACC and LKAS) that is being executed. For example, in the second assistance control, the controller 15 cancels one of ACC and LKAS. At this time, the controller 15 may notify the driver via the HMI 8 that one of ACC and LKAS is canceled because the driver is gripping the steering wheel 22 with only the non-dominant hand.

In a case where the controller 15 determines that the driver is not gripping the steering wheel 22 with only the non-dominant hand (step ST16: No), the controller 15 determines whether the driver is gripping the steering wheel 22 with both hands (step ST18) based on the detection result of the grip sensor 35. More specifically, when the detection state of the grip sensor 35 is the both detection state, the controller 15 determines that the driver is gripping the steering wheel 22 with both hands. Otherwise, the controller 15 determines that the driver is not gripping the steering wheel 22 with both hands.

In a case where the controller 15 determines that the driver is gripping the steering wheel 22 with both hands (step ST18: Yes), the controller 15 executes a third assistance control as the driving assistance control (step ST19). In the third assistance control, the controller 15 continues the driving assistance control (i.e., ACC and LKAS) that is being executed. Even in a case where the above-mentioned assistance canceling condition is satisfied while the third assistance control is being executed, the controller 15 continues the specific control included in the driving assistance control that is being executed. For example, even in a case where the lateral acceleration of the vehicle 1 becomes the above-mentioned reference acceleration or more while the third assistance control is being executed, the controller 15 continues LKAS without canceling LKAS.

In a case where the controller 15 determines that the driver is not gripping the steering wheel 22 with both hands (step ST18: No), there is a high possibility that the driver is not gripping the steering wheel 22. Accordingly, the controller 15 executes grip prompting control to prompt the driver to grip the steering wheel 22 (step ST20). In the grip prompting control, the controller 15 prompts the driver to grip the steering wheel 22 via the HMI 8.

<The Effect>

As described above, the controller 15 makes the contents of the driving assistance control different (steps ST15, ST17, and ST19) depending on whether determining that the driver is gripping the steering wheel 22 with only the dominant hand (step ST14: Yes) or determining that the driver is not gripping the steering wheel 22 with only the dominant hand (step ST14: No). Thus, it is possible to provide the driving assistance control that is comfortable for the driver depending on whether the driver is gripping the steering wheel 22 with the dominant hand. Accordingly, the compatibility between the driver and the driving assistance control can be improved.

The Modified Embodiments

In the above embodiment, the controller 15 determines whether the driver is gripping the steering wheel 22 with only the dominant hand in step ST14 of the control changing process. In another embodiment, the controller 15 may determine whether the driver is gripping the steering wheel 22 with at least the dominant hand (i.e., with only the dominant hand or with both hands) in step ST14 of the control changing process. In other words, the feature "the controller 15 determines whether the driver is gripping the steering wheel 22 with the dominant hand" covers both the feature "the controller 15 determines whether the driver is gripping the steering wheel 22 with only the dominant hand" and the feature "the controller 15 determines whether the driver is gripping the steering wheel 22 with at least the dominant hand".

In the above embodiment, the controller 15 estimates the dominant hand of the driver based only on the left hand count value CL and the right hand count value CR in step ST13 of the control changing process. In another embodiment, the controller 15 may estimate the dominant hand of the driver based on the left hand count value CL, the right hand count value CR, and the both hands count value CB in step ST13 of the control changing process. For example, the controller 15 may estimate a corresponding hand of the driver to be a dominant hand of the driver. The corresponding hand of the driver corresponds to one of the left hand count value CL or the right hand count value CR that accounts for more than a prescribed reference ratio (for example, 50%) to the total count value (the sum of the left hand count value CL, the right hand count value CR, and the both hands count value CB).

In the above embodiment, the controller 15 changes the contents of ACC and/or LKAS in the control changing process. In another embodiment, the controller 15 may change the contents of the driving assistance control (for example, CMBS) other than ACC and LKAS in the control changing process.

In the above embodiment, the grip tendency data GD includes data (the left hand count value CL, the right hand count value CR, and the both hands count value CB) indicating the number of times the driver grips the steering wheel 22 with only one hand or both hands while the driving assistance control is being executed. In another embodiment, the grip tendency data GD may include data indicating frequency with which the driver grips the steering wheel 22 with only one hand or both hands while the driving assistance control is being executed or a period in which the driver grips the steering wheel 22 with only one hand or both hands while the driving assistance control is being executed.

In the above embodiment, the grip sensor 35 includes two capacitive sensors 53 and 54 and two capacitive sensors 56 and 57 on the right portion and the left portion of the steering wheel 22, respectively. In another embodiment, the grip sensor 35 may include one capacitive sensor or three or more capacitive sensors on the right portion and the left portion of the steering wheel 22, respectively. For example, the third extending portion 63 of the first right capacitive sensor 53 and the first left capacitive sensor 56 in the above embodiment may be separated from the first extending portion 61 and the second extending portion 62 thereof. Accordingly, the grip sensor 35 may include three capacitive sensors on the right portion and the left portion of the steering wheel 22, respectively.

In the above embodiment, the grip sensor 35 includes the capacitive sensors 53, 54, 56, and 57 in the hub 43, the right spoke 45, and the left spoke 46 of the steering wheel 22. In another embodiment, the grip sensor 35 may include a capacitive sensor in the rim 44 of the steering wheel 22.

In the above embodiment, the steering wheel 22 including the annular rim 44 is used as the steering operation member. In another embodiment, the operation member without the annular rim 44 (for example, a control stick) may be used as the steering operation member.

Concrete embodiments of the present invention have been described in the foregoing, but the present invention should not be limited by the foregoing embodiments and various modifications and alterations are possible within the scope of the present invention.

The invention claimed is:

1. A driving assistance device, comprising;
a steering operation member configured to receive a steering operation of a vehicle by a driver;
a steering device configured to turn wheels of the vehicle;
a grip sensor provided in the steering operation member and configured to detect a grip position of the driver on the steering operation member; and
a controller configured to execute driving assistance control of the vehicle,
wherein the controller is configured to
control the steering device to turn the vehicle in response to the steering operation on the steering operation member by the driver,
store grip tendency data related to a tendency of the grip position of the driver on the steering operation member in execution of the driving assistance control,
determine whether the driver is gripping the steering operation member with a dominant hand based on the grip tendency data and a detection result of the grip sensor, and
make contents of the driving assistance control different depending on whether determining that the driver is gripping the steering operation member with the dominant hand or determining that the driver is not gripping the steering operation member with the dominant hand.

2. The driving assistance device according to claim 1, wherein the controller is configured to
determine, based on the grip tendency data and the detection result of the grip sensor, whether the driver is gripping the steering operation member with only the dominant hand, whether the driver is gripping the steering operation member with only a hand opposite to the dominant hand, and whether the driver is gripping the steering operation member with both hands,
make the contents of the driving assistance control different depending on whether determining that the driver is gripping the steering operation member with only the dominant hand, determining that the driver is gripping the steering operation member with only the hand opposite to the dominant hand, or determining that the driver is gripping the steering operation member with both hands.

3. The driving assistance device according to claim 2, wherein in a case where the controller determines that the driver is gripping the steering operation member with only the dominant hand and a prescribed assistance canceling condition is satisfied while the driving assistance control is being executed, the controller cancels specific control included in the driving assistance control that is being executed, and
in a case where the controller determines that the driver is gripping the steering operation member with both hands and the assistance canceling condition is satisfied while the driving assistance control is being executed, the controller continues the specific control included in the driving assistance control that is being executed.

4. The driving assistance device according to claim 2, wherein in a case where the controller determines that the driver is gripping the steering operation member with only the dominant hand while the driving assistance control is being executed, the controller continues the driving assistance control that is being executed,
in a case where the controller determines that the driver is gripping the steering operation member with only the hand opposite to the dominant hand while the driving assistance control is being executed, the controller cancels at least a portion of the driving assistance control that is being executed.

5. The driving assistance device according to claim 4, wherein the controller is configured to execute, as the driving assistance control, following travel control to cause the vehicle to follow a preceding vehicle while maintaining a prescribed inter-vehicle distance, and lane keeping assistance control to assist the steering operation of the vehicle by the driver such that the vehicle maintains a traveling position within a lane,
in a case where the controller determines that the driver is gripping the steering operation member with only the dominant hand while the following travel control and the lane keeping assistance control are being executed simultaneously, the controller continues the following travel control and the lane keeping assistance control that are being executed, and
in a case where the controller determines that the driver is gripping the steering operation member with only the hand opposite to the dominant hand while the following travel control and the lane keeping assistance control are being executed simultaneously, the controller cancels at least one of the following travel control and the lane keeping assistance control that are being executed.

6. The driving assistance device according to claim 5, wherein the controller is configured to collect the grip tendency data while the following travel control and the lane keeping assistance control are being executed simultaneously.

7. The driving assistance device according to claim 1, wherein the grip tendency data at least includes:
  left hand data that indicates the number of times the driver grips the steering operation member with only a left hand while the driving assistance control is being executed, frequency with which the driver grips the steering operation member with only the left hand while the driving assistance control is being executed, or a period in which the driver grips the steering operation member with only the left hand while the driving assistance control is being executed; and
  right hand data that indicates the number of times the driver grips the steering operation member with only a right hand while the driving assistance control is being executed, frequency with which the driver grips the steering operation member with only the right hand while the driving assistance control is being executed, or a period in which the driver grips the steering operation member with only the right hand while the driving assistance control is being executed, and
  the controller is configured to
  estimate the dominant hand of the driver based on the grip tendency data, and
  determine whether the driver is gripping the steering operation member with the dominant hand based on an estimation result of the dominant hand of the driver and the detection result of the grip sensor.

8. The driving assistance device according to claim 7, wherein the grip tendency data further includes both hands data that indicates the number of times the driver grips the steering operation member with both hands while the driving assistance control is being executed, frequency with which the driver grips the steering operation member with both hands while the driving assistance control is being executed, or a period in which the driver grips the steering operation member with both hands while the driving assistance control is being executed.

9. The driving assistance device according to claim 1, wherein the grip sensor includes a capacitive sensor configured such that capacitance of the capacitive sensor changes as a driver's hand approaches the steering operation member.

10. The driving assistance device according to claim 1, wherein the steering operation member is a rotatable steering wheel, and
  the steering wheel includes:
  a hub provided on a rotation axis of the steering wheel;
  an annular rim provided outside the hub with respect to a radial direction; and
  a plurality of spokes extending in the radial direction and connecting the hub and the rim.

11. The driving assistance device according to claim 10, wherein the grip sensor includes a plurality of capacitive sensors that can be capacitively coupled to an object approaching the steering wheel, and
  at least a part of the plurality of capacitive sensors are arranged in the plurality of spokes.

\* \* \* \* \*